(12) United States Patent
Choi

(10) Patent No.: US 11,400,909 B2
(45) Date of Patent: Aug. 2, 2022

(54) PARKING BRAKE APPARATUS FOR VEHICLE

(71) Applicant: HYUNDAI MOBIS CO., LTD., Seoul (KR)

(72) Inventor: Moo Jin Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 82 days.

(21) Appl. No.: 16/930,132

(22) Filed: Jul. 15, 2020

(65) Prior Publication Data
US 2021/0016759 A1   Jan. 21, 2021

(30) Foreign Application Priority Data
Jul. 16, 2019   (KR) .................. 10-2019-0086031

(51) Int. Cl.
| | | |
|---|---|---|
| *B60T 13/74* | (2006.01) |
| *F16D 55/226* | (2006.01) |
| *B60T 1/06* | (2006.01) |
| *F16D 125/34* | (2012.01) |
| *F16D 121/24* | (2012.01) |
| *F16D 125/50* | (2012.01) |

(52) U.S. Cl.
CPC ............ *B60T 13/746* (2013.01); *B60T 1/065* (2013.01); *F16D 55/226* (2013.01); *F16D 2121/24* (2013.01); *F16D 2125/34* (2013.01); *F16D 2125/50* (2013.01)

(58) Field of Classification Search
CPC .... F16D 55/226; F16D 65/183; F16D 65/568; F16D 2121/24; F16D 2125/34; F16D 2125/40; F16D 2125/50; F16D 2125/52; B60T 13/741; B60T 13/746
See application file for complete search history.

(56) References Cited

U.S. PATENT DOCUMENTS

| | | | | |
|---|---|---|---|---|
| 10,823,242 | B2 * | 11/2020 | Choi ..................... | B60T 13/741 |
| 2014/0034432 | A1 * | 2/2014 | Bull ....................... | B60T 13/741 |
| | | | | 188/106 R |
| 2019/0063527 | A1 * | 2/2019 | Thomas ................ | B60T 13/741 |
| 2020/0049215 | A1 * | 2/2020 | Song ...................... | F16D 65/18 |
| 2020/0361437 | A1 * | 11/2020 | Esnee ................... | B60T 13/741 |
| 2021/0016758 | A1 * | 1/2021 | Choi ..................... | F16D 65/183 |
| 2021/0016759 | A1 * | 1/2021 | Choi ..................... | F16D 55/226 |

(Continued)

FOREIGN PATENT DOCUMENTS

| | | |
|---|---|---|
| DE | 69925489 T2 | 5/2006 |
| DE | 102006044461 A1 | 4/2007 |

(Continued)

OTHER PUBLICATIONS

Office Action dated Mar. 22, 2021 in the corresponding German Patent Application No. 102020118802.1.

*Primary Examiner* — Nicholas J Lane
(74) *Attorney, Agent, or Firm* — NovoTechIP International PLLC

(57) ABSTRACT

A parking brake apparatus for a vehicle includes a driving unit including a plurality of motor sections; a pair of pressing units receiving power from the driving unit and pressing a brake pad; and a load transmission unit installed between the pair of pressing units, connected to each of the pair of pressing units, and transmitting a pressing load of any one of the pair of pressing units to the other pressing unit.

12 Claims, 7 Drawing Sheets

(56) References Cited

U.S. PATENT DOCUMENTS

| | | | | |
|---|---|---|---|---|
| 2021/0016760 A1* | 1/2021 | Hong | ................... | B60T 13/741 |
| 2021/0016761 A1* | 1/2021 | Choi | ................... | F16D 65/183 |
| 2021/0018054 A1* | 1/2021 | Jo | ................... | F16D 65/568 |
| 2021/0086742 A1* | 3/2021 | Kwon | ................... | F16D 55/02 |
| 2021/0122351 A1* | 4/2021 | Hong | ................... | F16D 65/568 |

FOREIGN PATENT DOCUMENTS

| | | |
|---|---|---|
| DE | 102009023432 A1 | 12/2009 |
| DE | 112015004418 T5 | 8/2017 |

\* cited by examiner

PARKING BRAKE APPARATUS FOR VEHICLE

CROSS-REFERENCE TO RELATED APPLICATION

This application claims priority from and the benefit of Korean Patent Application No. 10-2019-0086031, filed on Jul. 16, 2019, which is hereby incorporated by reference for all purposes as if set forth herein.

BACKGROUND

Field

Exemplary embodiments of the present disclosure relate to a parking brake apparatus for a vehicle, and more particularly, to a parking brake apparatus for a vehicle capable of uniformly transmitting loads to a brake pad.

Discussion of the Background

In general, an actuator of an electronic parking brake for a vehicle is constructed by a motor and a power transmission device for operating friction pads installed in a caliper of a disc brake apparatus when parking.

When a driver pushes a parking brake switch, the rotational force of a motor of the actuator is transmitted to an input shaft of the caliper through the power transmission device such as a reduction gear. Through the rotation of the input shaft, a pressure connection sleeve is moved forward, and by the forward movement of the pressure connection sleeve, a piston which accommodates the pressure connection sleeve and a caliper housing are moved toward each other, such that two friction pads mounted to the piston and the caliper housing are pressed against both surfaces of a disc to restrain the rotation of the disc.

In the case where a plurality of pistons are provided and receive a driving force from a single actuator, loads may be non-uniformly transmitted to the plurality of pistons. In this case, uneven wear of friction pads may be caused, and the braking performance may be degraded.

SUMMARY

Various embodiments are directed to a parking brake apparatus for a vehicle capable of uniformly transmitting loads to a brake pad by a load transmission unit.

In an embodiment, a parking brake apparatus for a vehicle may include: a driving unit including a plurality of motor sections; a pair of pressing units receiving power from the driving unit and pressing a brake pad; and a load transmission unit installed between the pair of pressing units, connected to each of the pair of pressing units, and transmitting a pressing load of any one of the pair of pressing units to the other pressing unit.

Each of the pair of pressing units may include: a sun gear section rotated by receiving power from the driving unit; a planetary gear section rotated by being meshed with the sun gear section; a carrier section coupled to the planetary gear section; and a piston section connected to the carrier section, and pressing the brake pad by being moved toward the brake pad through receiving rotational power from the planetary gear section.

The pair of pressing units may individually receive power from the plurality of motor sections, respectively.

Any one of the pair of pressing units may receive power by being connected with some of the plurality of motor sections, and the other one of the pair of pressing units may receive power by being connected with the other some of the plurality of motor sections.

The load transmission unit may include a pair of ring gear sections, each of the pair of ring gear sections may be rotatable by being meshed with the planetary gear section, and the pair of ring gear sections may be directly or indirectly meshed with each other.

Each of the pair of ring gear sections may include: a ring gear inner part formed with an internal gear portion on an inner circumferential surface thereof to be meshed with the planetary gear section; and a ring gear outer part coupled to an outer surface of the ring gear inner part, and formed with an external gear portion on an outer circumferential surface thereof to be meshed with the other ring gear section neighboring thereon.

The ring gear inner part and the ring gear outer part may be integrally formed.

The ring gear inner part may project more toward the sun gear section than the ring gear outer part, and may surround the sun gear section and the planetary gear section.

The carrier section may be spline-coupled to the piston section.

The piston section may receive rotational power from the carrier section, and may be linearly reciprocated relative to the brake pad depending on a rotating direction of the carrier section.

The sun gear section may be dynamically connected to the driving unit through a connection gear section.

The sun gear section may include: a sun gear connection body coupled to the connection gear section; and a sun gear formed on the sun gear connection body, having a rotation center that is concentric with a rotation center of the connection gear section, and meshed with the planetary gear section.

In the parking brake apparatus for a vehicle according to the present disclosure, when a pressing load is concentrated on any one of a plurality of pressing units, a load transmission unit may transmit the pressing load to the remaining pressing unit, so that the pressing units may press a brake pad with uniform loads.

DETAILED DESCRIPTION OF THE ILLUSTRATED EMBODIMENTS

Hereinafter, a parking brake apparatus for a vehicle will be described below with reference to the accompanying drawings through various examples of embodiments. It should be noted that the drawings are not to precise scale and may be exaggerated in thickness of lines or sizes of components for descriptive convenience and clarity only.

Furthermore, the terms used herein are defined by taking functions of the invention into account and can be changed according to the intention of users or operators or the practice. Therefore, definition of the terms should be made according to the overall disclosures set forth herein.

Figure 1:
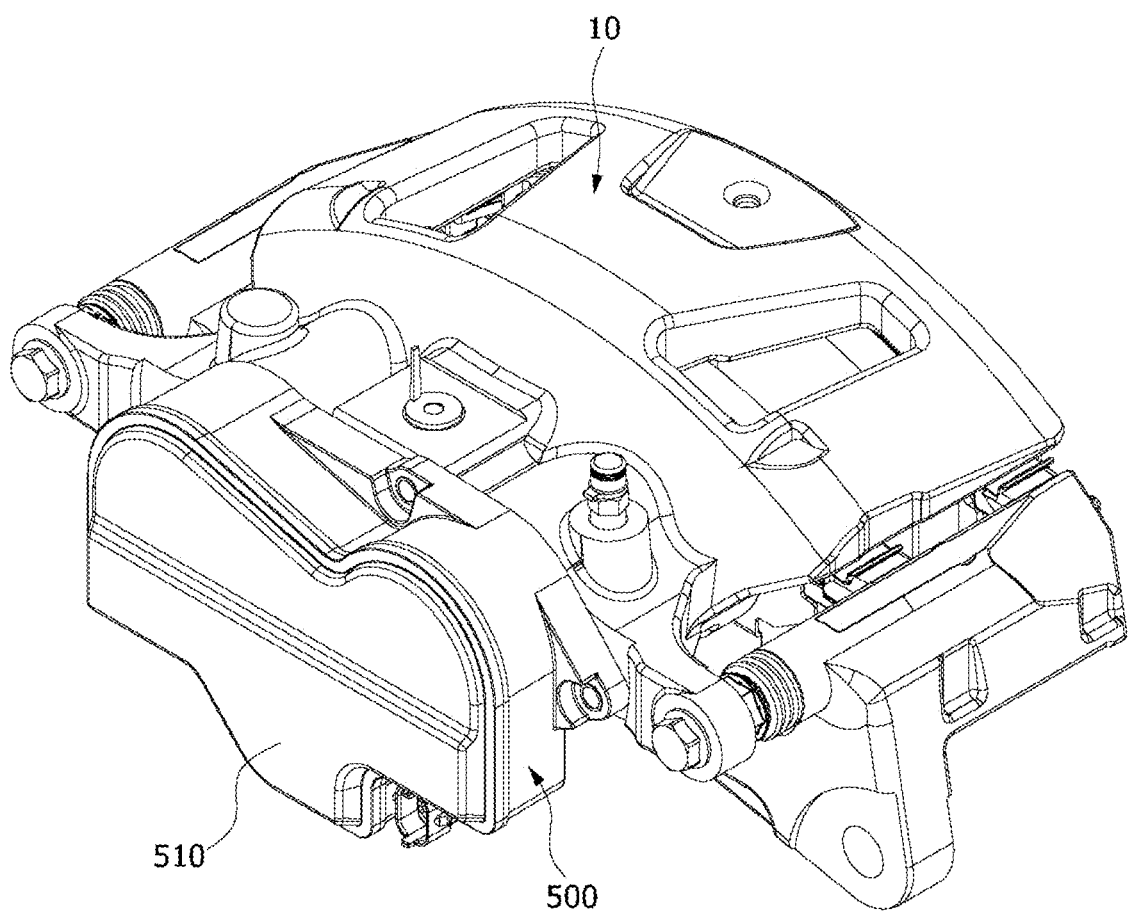
FIG. 1 is a perspective view illustrating a parking brake apparatus for a vehicle in accordance with an embodiment of the present disclosure.
Figure 2:
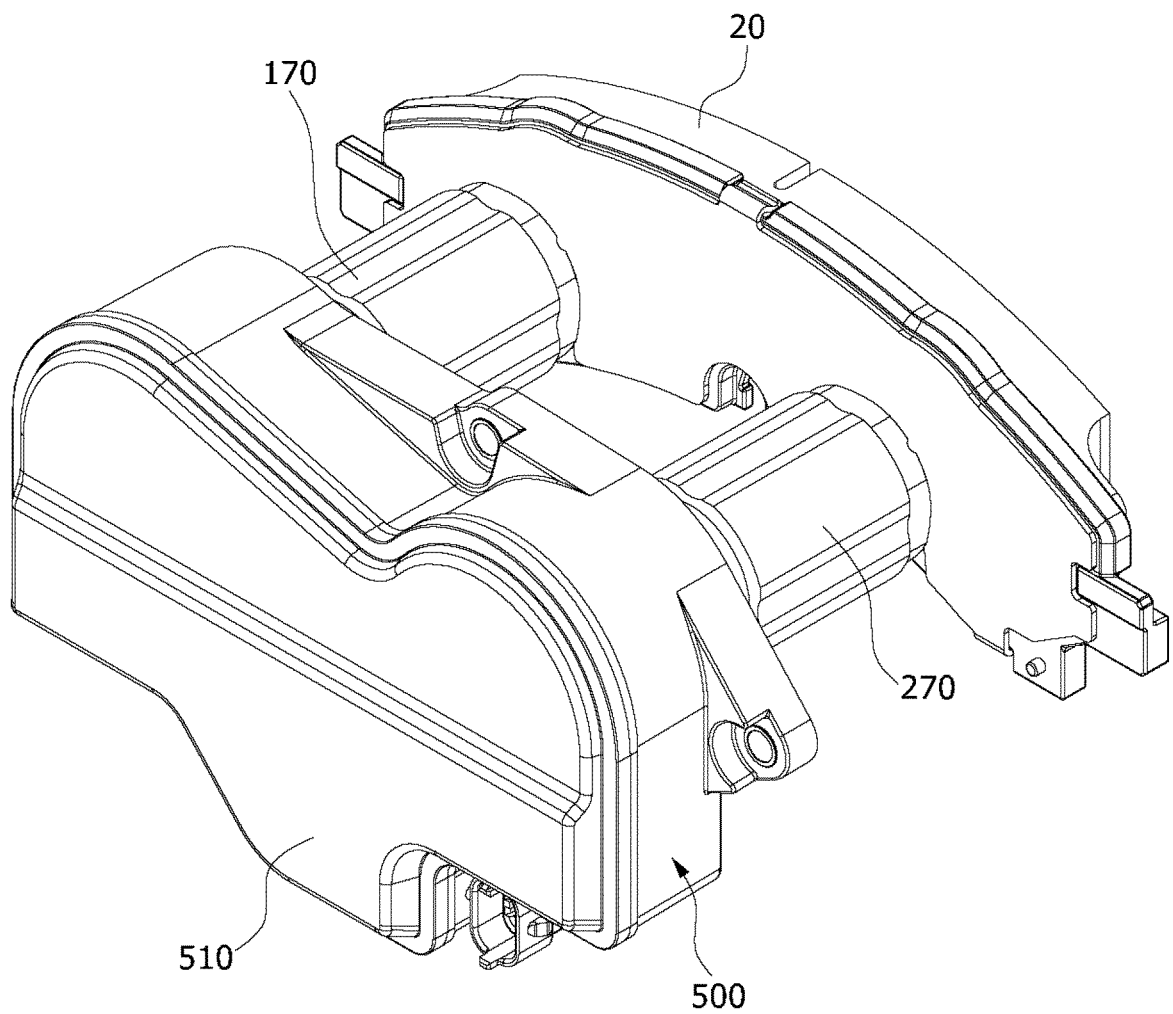
FIG. 2 is a partial perspective view illustrating the parking brake apparatus for a vehicle in accordance with the embodiment of the present disclosure.
Figure 3:
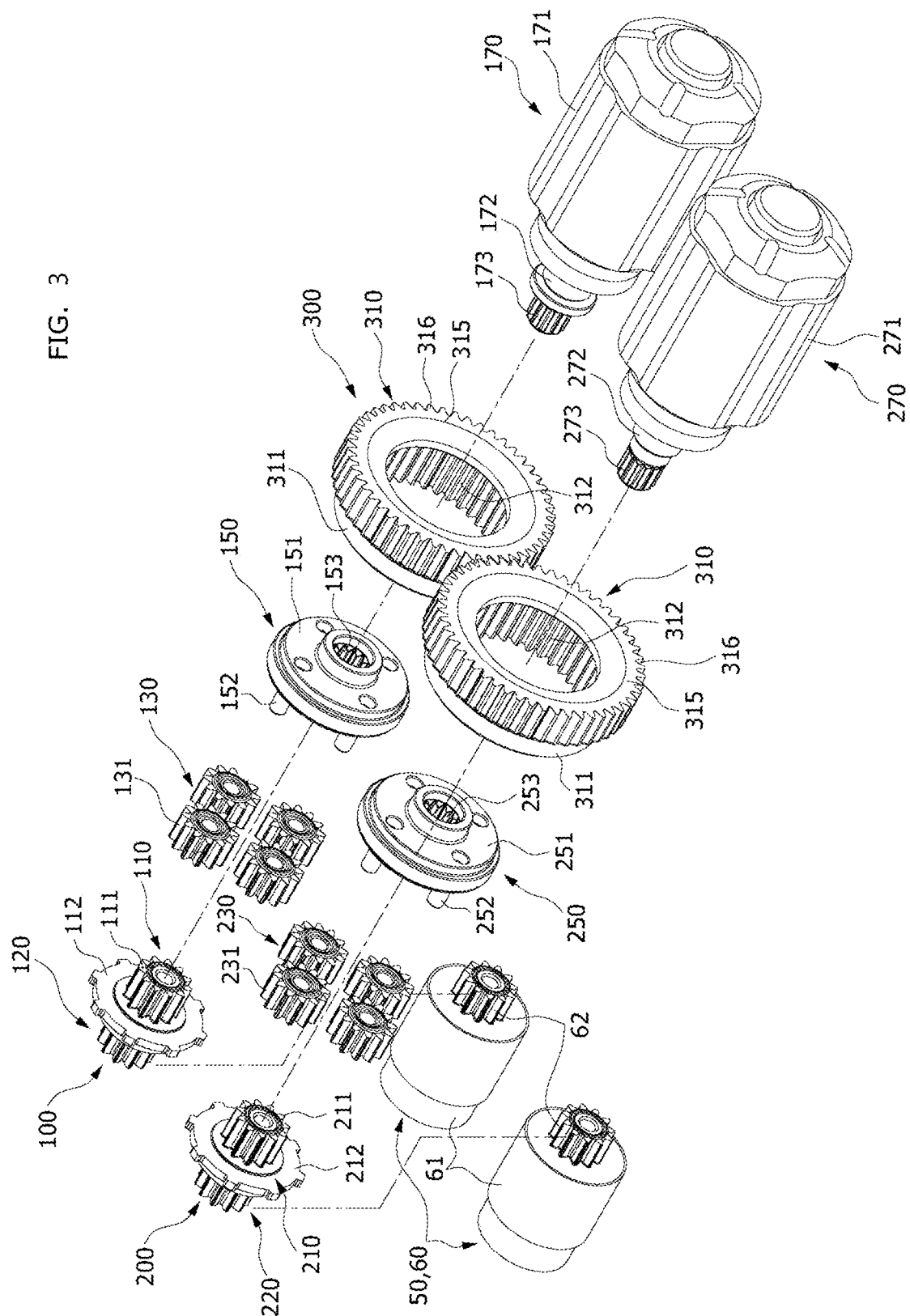
FIG. 3 is a partial exploded view illustrating the parking brake apparatus for a vehicle in accordance with the embodiment of the present disclosure.
Figure 4:
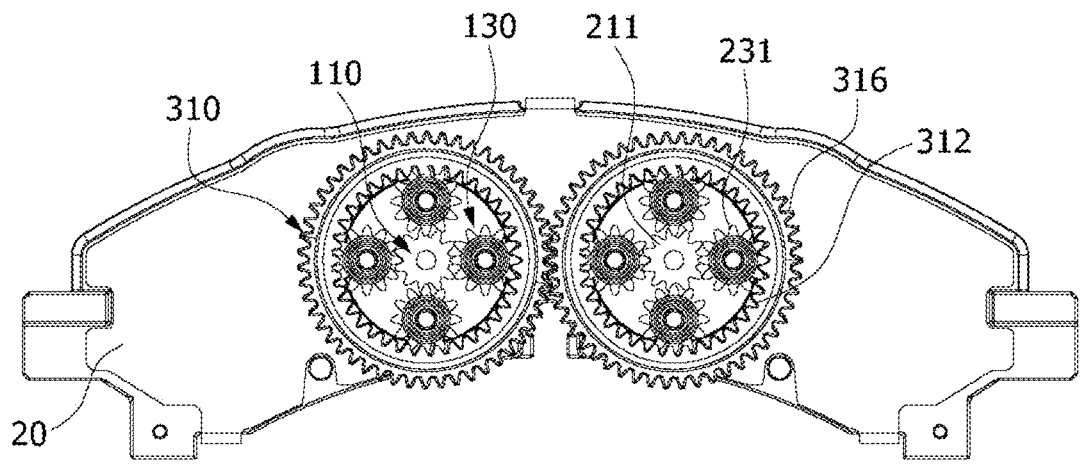
FIG. 4 is a front view illustrating the parking brake apparatus for a vehicle in accordance with the embodiment of the present disclosure.
Figure 5:
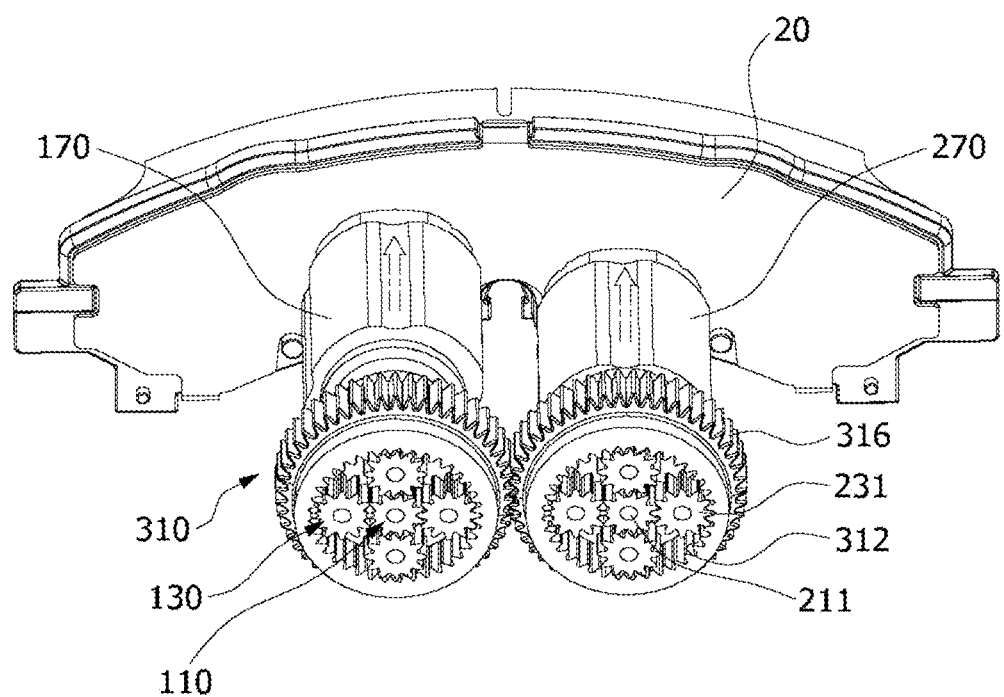
FIGS. 5 to 7 are state views illustrating driving states of the parking brake apparatus for a vehicle in accordance with the embodiment of the present disclosure.
Figure 6:
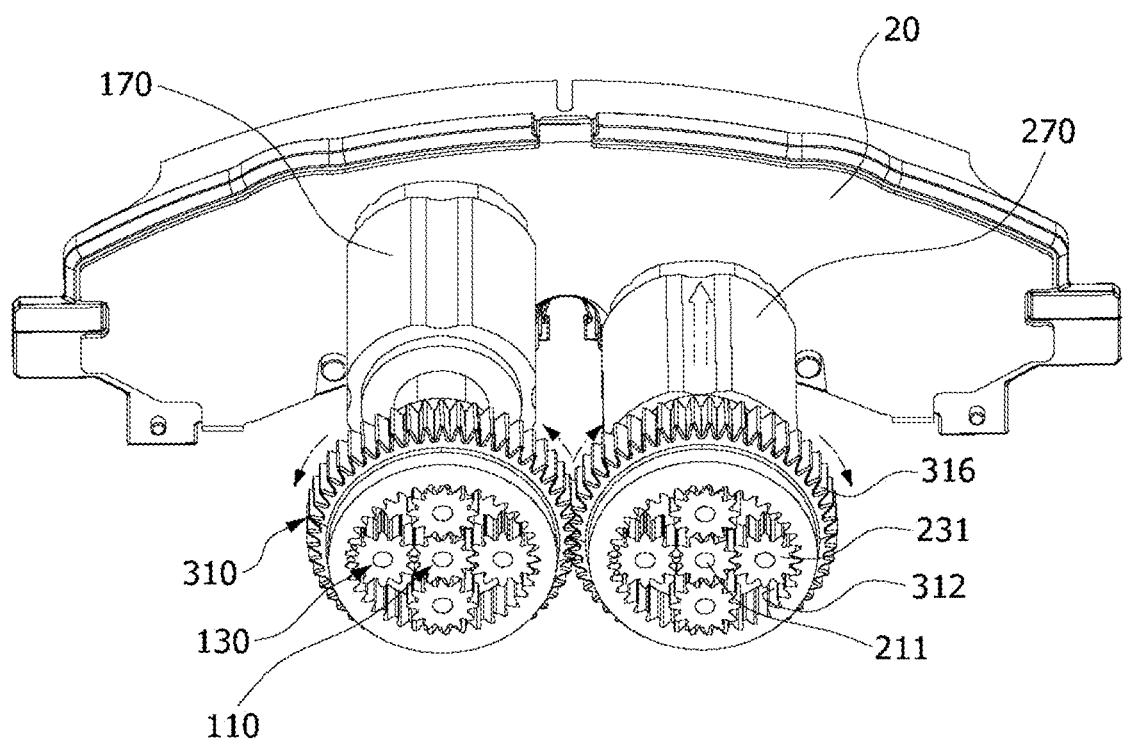
Figure 7:
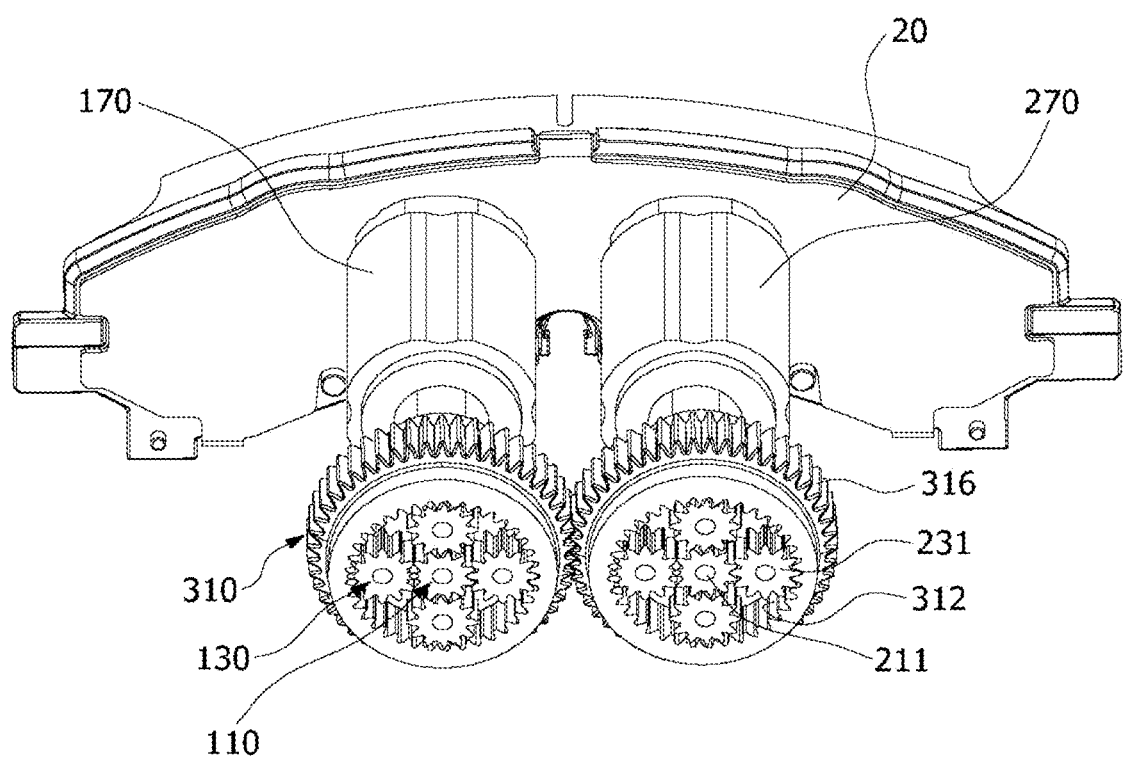

FIG. 1 is a perspective view illustrating a parking brake apparatus for a vehicle in accordance with an embodiment of the present disclosure. FIG. 2 is a partial perspective view illustrating the parking brake apparatus for a vehicle in accordance with the embodiment of the present disclosure. FIG. 3 is a partial exploded view illustrating the parking brake apparatus for a vehicle in accordance with the embodiment of the present disclosure. FIG. 4 is a front view illustrating the parking brake apparatus for a vehicle in accordance with the embodiment of the present disclosure. FIGS. 5 to 7 are state views illustrating driving states of the parking brake apparatus for a vehicle in accordance with the embodiment of the present disclosure.

Referring to FIGS. 1 to 5, a parking brake apparatus 1 for a vehicle in accordance with the embodiment of the present disclosure includes a driving unit 50, pressing units 100 and 200, and a load transmission unit 300.

The driving unit 50 includes a motor section 60 which receives electric power from the outside and generates power. The motor section 60 includes a motor body 61 which generates power and a driving gear 62 which is rotated by the motor body 61.

In the present embodiment, the driving gear 62 is formed in the shape of a spur gear, but the shape thereof may be replaced with other gear shapes or the likes as long as the driving gear 62 can transmit power to the pressing units 100 and 200.

The driving unit 50 may further include a power transmission section (not illustrated). That is to say, the motor section 60 of the driving unit 50 may transmit generated power directly to the pressing units 100 and 200, or may transmit generated power to the pressing units 100 and 200 by the medium of the power transmission section.

In the present embodiment, the driving unit 50 includes two motor sections 60, and separately provides power to each of connection gear sections 120 and 220.

In the present embodiment, since balancing is implemented between planetary gear sections 130 and 230 which will be described later, even though power is separately provided to the respective pressing units 100 and 200 by using the plurality of motor sections 60, the same loads may be transmitted to piston sections 170 and 270.

In particular, using a plurality of small-capacity motor sections instead of using a large-capacity motor section to secure the same capacity may provide advantages in that it is possible to reduce the size of a brake apparatus and improve the degree of freedom of installation.

Referring to FIGS. 1 to 3, the parking brake apparatus 1 for a vehicle in accordance with the present embodiment includes a mounting case 500 and a mounting cover 510.

The driving unit 50, the pressing units 100 and 200 and the load transmission unit 300 are disposed in the mounting case 500. The mounting cover 510 is detachably coupled to the mounting case 500, and closes one side opening of the mounting case 500 to prevent foreign matters from entering the inside of the mounting case 500.

The pressing units 100 and 200 in accordance with the embodiment of the present disclosure are installed in a caliper housing 10, receive power from the driving unit 50, and press a brake pad 20 which is brought into frictional contact with a disc (not illustrated).

A plurality of pressing units 100 and 200 are provided. The plurality of pressing units 100 and 200 are disposed side by side. The pressing units 100 and 200 are symmetrically installed at left and right sides (in FIG. 4) with respect to the center portion of the brake pad 20.

The pressing units 100 and 200 receive power from the driving unit 50, and press the brake pad 20 with the same pressing loads. The brake pad 20 is moved toward the disc by such pressing forces, and a braking force is generated due to the friction between the brake pad 20 and the disc.

The pressing units 100 and 200 in accordance with the embodiment of the present disclosure include sun gear sections 110 and 210, the connection gear sections 120 and 220, the planetary gear sections 130 and 230, carrier sections 150 and 250, and the piston sections 170 and 270.

Meanwhile, in the illustration of FIGS. 4 to 7, the connection gear sections 120 and 220 are omitted for the sake of convenience in explanation.

The connection gear sections 120 and 220 transmit power, provided from the driving unit 50, to the sun gear sections 110 and 210. The connection gear sections 120 and 220 are formed in the shapes of spur gears since they are meshed with the driving gears 62, but may be changed in their shapes depending on changes in the shapes of the driving gears 62.

The sun gear sections 110 and 210 are rotated by receiving power from the driving unit 50. According to the present embodiment, the sun gear sections 110 and 210 are coupled to the connection gear sections 120 and 220. The sun gear sections 110 and 210 may be rotated through the connection gear sections 120 and 220 which are dynamically connected to the driving unit 50.

The sun gear sections 110 and 210 include sun gears 111 and 211 and sun gear connection bodies 112 and 212.

The sun gear connection bodies 112 and 212 are coupled to the connection gear sections 120 and 220. The sun gears 111 and 211 are formed at the center portions of the sun gear connection bodies 112 and 212, and are formed in the shapes of gears on the outer circumferential surfaces thereof to be meshed with the planetary gear sections 130 and 230.

The sun gear sections 110 and 210 are concentric with the rotation centers of the connection gear sections 120 and 220. Therefore, if the power of the driving unit 50 is transmitted to the connection gear sections 120 and 220, the connection gear sections 120 and 220 and the sun gear sections 110 and 210 are rotated on the same rotation axes.

The sun gear sections 110 and 210 may be integrally formed with the connection gear sections 120 and 220. Alternatively, the sun gear sections 110 and 210 may be formed as separate bodies from the connection gear sections 120 and 220, and may be integrated with the connection gear sections 120 and 220 through coupling.

As the sun gear sections 110 and 210 are integrally formed with the connection gear sections 120 and 220 or are integrated with the connection gear sections 120 and 220, if the connection gear sections 120 and 220 are rotated, the sun gear sections 110 and 210 are also rotated together.

The sun gears 111 and 211 are disposed inside the planetary gear sections 130 and 230, respectively, each of which is provided with a plurality of gears. The planetary gear sections 130 and 230 rotate and revolve while being meshed with the sun gears 111 and 211.

The planetary gear sections 130 and 230 include a plurality of planetary gears 131 and 231. The present embodiment illustrates that the planetary gears 131 and 231 each are exemplified as four. However, it is to be noted that the present embodiment is not limited thereto, and thus, the planetary gears 131 and 231 may each be three or less or five or more.

The plurality of planetary gears 131 and 231 are disposed at equal angles about the rotation centers of the sun gears 111 and 211. The plurality of planetary gears 131 and 231 are meshed with the sun gears 111 and 211, and rotate and/or revolve when the sun gears 111 and 211 are rotated.

The planetary gear sections 130 and 230 are coupled to the carrier sections 150 and 250. In the case where the plurality of planetary gears 131 and 231 revolve around the sun gears 111 and 211, the carrier sections 150 and 250 are also rotated in a clockwise or counterclockwise direction (in FIG. 4).

As the carrier sections 150 and 250 are rotated, the piston sections 170 and 270 are moved toward the brake pad 20 and press the brake pad 20.

The carrier sections 150 and 250 include carrier bodies 151 and 251, carrier rotation shafts 152 and 252, and carrier connection parts 153 and 253.

The carrier rotation shafts 152 and 252 are formed on the carrier bodies 151 and 251 to project toward the planetary gear sections 130 and 230.

The carrier rotation shafts 152 and 252 are provided in plural numbers that are the same as the numbers of the planetary gears 131 and 231 of the planetary gear sections 130 and 230, and are coupled through the planetary gears 131 and 231 of the planetary gear sections 130 and 230. Due to this fact, the planetary gears 131 and 231 of the planetary gear sections 130 and 230 may perform rotating motion while being rotated on the carrier rotation shafts 152 and 252.

The carrier connection parts 153 and 253 are formed on the inner circumferential surfaces of the carrier bodies 151 and 251, and are connected to piston connection parts 173 and 273 of the piston sections 170 and 270.

In the present embodiment, the carrier connection parts 153 and 253 have grooves, and the piston connection parts 173 and 273 have protrusions which are inserted into the grooves of the carrier connection parts 153 and 253.

Alternatively, the piston connection parts 173 and 273 may have grooves, and the carrier connection parts 153 and 253 may have protrusions which are inserted into the grooves of the piston connection parts 173 and 273.

The carrier connection parts 153 and 253 and the piston connection parts 173 and 273 may be spline-coupled to each other. Of course, the carrier sections 150 and 250 and the piston sections 170 and 270 may be coupled in other ways, for example, screw coupling or the like, in addition to the spline coupling.

The piston sections 170 and 270 are connected with the carrier sections 150 and 250. The piston sections 170 and 270 are rotated together as the carrier sections 150 and 250 are rotated.

The piston sections 170 and 270 include piston bodies 171 and 271, piston shafts 172 and 272, and the piston connection parts 173 and 273.

The piston bodies 171 and 271 are formed to be internally hollow, and are disposed to be capable of being brought into contact with the brake pad 20 by the movement thereof. The piston bodies 171 and 271 may be formed in cylindrical shapes.

The piston bodies 171 and 271 are coupled with the piston shafts 172 and 272, and the piston connection parts 173 and 273 are formed at ends of the piston shafts 172 and 272, that is, ends of the piston shafts 172 and 272 which face the carrier sections 150 and 250.

When the carrier sections 150 and 250 are rotated, the piston connection parts 173 and 273 which are spline-coupled to the carrier connection parts 153 and 253 are rotated, and thereby, the rotational motion of the carrier sections 150 and 250 is converted into the linear motion of the piston sections 170 and 270.

Due to the linear movement of the piston sections 170 and 270, the piston sections 170 and 270 are moved toward the brake pad 20. Therefore, as the piston sections 170 and 270 are brought into contact with the brake pad 20 and press the brake pad 20, a braking force is generated due to the friction between the brake pad 20 and the disc.

The load transmission unit 300 is connected to each of the pair of pressing units 100 and 200, and transmits a pressing load of any one of the pressing units 100 and 200 to the other of the pressing units 100 and 200.

The load transmission unit 300 in accordance with the embodiment of the present disclosure includes a pair of ring gear sections 310.

The pair of ring gear sections 310 are meshed with the planetary gear sections 130 and 230, respectively, to be able to be rotated thereby.

The pair of ring gear sections 310 may be directly meshed with each other. That is to say, since the pair of ring gear sections 310 are directly connected to each other, power loss in transmitting power of any one of the pair of ring gear sections 310 to the other may be reduced.

As the pair of ring gear sections 310 are directly meshed with each other, a space that is occupied by the pressing units 100 and 200 and the load transmission unit 300 may be reduced.

Alternatively, the pair of ring gear sections 310 may be indirectly meshed by the medium of at least one transmission gear part (not illustrated). In other words, the transmission gear part may be disposed between the pair of ring gear sections 310, and is meshed with the ring gear sections 310 to dynamically connect the pair of ring gear sections 310.

Referring to FIGS. 3 to 7, the respective ring gear sections 310 are disposed outside the planetary gears 131 and 231.

Each ring gear section 310 includes a ring gear inner part 311 and a ring gear outer part 315.

The ring gear inner parts 311 are disposed outside the planetary gear sections 130 and 230, and internal gear portions 312 may be formed on the inner circumferential surfaces of the ring gear inner parts 311 to be meshed with the planetary gear sections 130 and 230.

The internal gear portion 312 of the ring gear inner part 311 which is installed at one side (the left side in FIG. 5) may be meshed with the planetary gear section 130 to be rotated in the clockwise or counterclockwise direction (in FIG. 5), and the rotational force thereof may be transmitted to the ring gear section 310, specifically, the ring gear outer part 315, which is disposed at the other side (the right side in FIG. 5).

The ring gear outer part 315 is coupled to the outer surface of the ring gear inner part 311, and an external gear portion 316 is formed on the outer circumferential surface of the ring gear outer part 315. The ring gear outer part 315 may be integrally formed with the ring gear inner part 311.

As the internal gear portion 312 of the ring gear inner part 311 which is installed at the one side (the left side in FIG. 5) is rotated while being meshed with the planetary gear section 130, the ring gear outer part 315 which is integrally formed with the ring gear inner part 311 is also rotated in the same direction.

Therefore, the rotational force of the ring gear outer part 315 at the one side is transmitted to the directly meshed ring gear section 310, specifically, the ring gear outer part 315, which is disposed at the other side (the right side in FIG. 5).

On the other hand, in the case where the transmission gear part is disposed between the pair of ring gear sections 310, the transmission gear part is rotated by being meshed with the external gear portions 316 which are formed on the ring gear sections 310, specifically, the ring gear outer parts 315, and transmits the rotational power of the ring gear section 310 disposed at the one side to the ring gear section 310 disposed at the other side.

The rotational power transmitted to the ring gear section 310 at the other side is transmitted to the carrier section 250 which is coupled to the planetary gears 231, via the ring gear inner part 311 and the planetary gears 231. As the planetary gears 231 rotate and revolve on the outer circumferential surface of the sun gear 211, the carrier section 250 which is coupled to the planetary gears 231 is rotated, and thus, the piston section 270 is moved toward the brake pad 20.

In the case where pressing loads for pressing the brake pad 20 are non-uniformly applied to the pair of pressing units 100 and 200, specifically, the pair of piston sections 170 and 270, the load transmission unit 300 may transmit a pressing load of the piston section 170 at the one side to the piston section 270 at the other side such that the pair of piston sections 170 and 270 may be brought into contact with the brake pad 20 with uniform pressing loads.

Of course, conversely, a pressing load of the piston section 270 at the other side may be transmitted to the piston section 170 at the one side.

Referring to FIGS. 4 to 7, the number of the ring gear sections 310 of the load transmission unit 300 may be changed. Therefore, the number of the ring gear sections 310 is not limited to two as in the present embodiment, and may be variously changed to one or three or more depending on a distance between the pair of pressing units 100 and 200.

The operation principle of the parking brake apparatus 1 for a vehicle constructed as mentioned above will be described below.

In the parking brake apparatus 1 for a vehicle in accordance with the embodiment of the present disclosure, the plurality of pressing units 100 and 200 press the brake pad 20 to move the brake pad 20 toward the disc, and a braking force is generated due to the contact friction between the brake pad 20 and the disc.

In the embodiment of the present disclosure, two pressing units 100 and 200 are provided. However, it is to be noted that the present disclosure is not limited thereto, and various modifications in which three or more pressing units are provided are possible.

The pressing units 100 and 200 receive power from the driving unit 50, and are linearly reciprocated relative to the brake pad 20.

In detail, the motor section 60 which individually transmits power is connected to each of the pressing units 100 and 200. Namely, according to the present embodiment, the two motor sections 60 are provided, and any one of the two motor sections 60 transmits power to the pressing unit 100 at the one side and the other of the two motor sections 60 transmits power to the pressing unit 200 at the other side.

Even though the two motor sections 60 individually transmit power to the pressing units 100 and 200 at the one side and the other side, the pressing units 100 and 200 include the planetary gear sections 130 and 230 in such a manner that balancing is implemented between the planetary gear sections 130 and 230. Thus, it is possible to transmit the same loads to the pressing units 100 and 200 at both the sides.

By driving the motor sections 60, the respective connection gear sections 120 and 220 which are meshed with the driving gears 62 are rotated.

According to the rotation of the connection gear sections 120 and 220, the sun gear sections 110 and 210 are also rotated in an interlocked manner, and the planetary gears 131 and 231 which are meshed with the sun gears 111 and 211 perform rotating motion and at the same time perform revolving motion around the sun gears 111 and 211.

As the planetary gears 131 and 231 perform the revolving motion, the carrier sections 150 and 250 which are coupled to the planetary gears 131 and 231 are rotated in the clockwise or counterclockwise direction. As the carrier sections 150 and 250 are rotated, the piston sections 170 and 270 which are coupled to the carrier sections 150 and 250 are moved toward the brake pad 20 and press the brake pad 20 by being brought into contact with the brake pad 20.

Due to various factors, the power provided from the driving unit 50 may be transmitted more to any one of the pair of pressing units 100 and 200.

As illustrated in FIG. 6, when driving the parking brake apparatus 1 for a vehicle, in the case where power is applied more to the pressing unit 100 disposed at the one side (the left side in FIG. 6) than the pressing unit 200 disposed at the other side (the right side in FIG. 6), the piston section 170 at the one side may be brought into contact with the brake pad 20 earlier than the piston section 270 at the other side.

If the piston section 170 at the one side is in a state in which it is already brought into contact with the brake pad 20 and the piston section 270 at the other side is in a state in which it is not yet brought into contact with the brake pad 20, the planetary gear section 130 of the pressing unit 100 at the one side performs only rotating motion. That is to say, the planetary gear section 130 does not perform revolving motion.

Since the power generated by the operation of the driving unit 50 is continuously transmitted to the sun gear 111, the sun gear 111 is continuously rotated. At this time, since the piston section 170 is in the state in which it is already brought into contact with the brake pad 20, the plurality of planetary gears 131 which are meshed with the sun gear 111 do not perform revolving operation but perform only rotating motion.

Since the pressing unit 100, specifically, the piston section 170, which is disposed at the left side in FIG. 6 can no longer be moved toward the brake pad 20, due to a reaction force to this, the planetary gears 131 perform only rotating motion, and the ring gear inner part 311 which is formed with the internal gear portion 312 to be meshed with the planetary gears 131 is rotated in the clockwise or counterclockwise direction.

The reaction force which is generated in the pressing unit 100 at the one side (the left side in FIG. 6) is transmitted to the pressing unit 200 at the other side (the right side in FIG. 6), through the ring gear outer part 315 which is integrally coupled with the ring gear inner part 311.

In detail, the power provided to the pressing unit 100 at the one side is transmitted to the piston section 270 at the other side through the external gear portion 316 at the other side, the internal gear portion 312 of the ring gear inner part 311, the planetary gear section 230 and the carrier section 250 coupled with the planetary gear section 230.

Accordingly, the power provided from the driving unit 50 is provided to the piston section 270 at the other side which is not yet brought into contact with the brake pad 20, and the linear movement of the piston section 170 at the one side which is already brought into contact with the brake pad 20 is stopped until the piston section 270 at the other side is brought into contact with the brake pad 20.

Thereafter, when both the piston sections 170 and 270 at the one side and the other side are brought into contact with the brake pad 20, the power of the driving unit 50 is provided to the respective piston sections 170 and 270 at the one side and the other side, and the piston sections 170 and 270 at the one side and the other side simultaneously press the brake pad 20 with uniform loads.

Referring to FIGS. 4 to 7, in the case where a pressing load is concentrated on the pressing unit 100 at the one side of the pair of pressing units 100 and 200, the load transmission unit 300 in accordance with the embodiment of the present disclosure may transmit the pressing load to the pressing unit 200 at the other side such that the pair of pressing units 100 and 200 may press the brake pad 20 toward the disc with uniform pressing loads.

Likewise, in the case where a pressing load is more concentrated on the pressing unit 200 at the other side of the pair of pressing units 100 and 200, the load transmission unit 300 may transmit the pressing load to the pressing unit 100 at the one side such that the pair of pressing units 100 and 200 may press the brake pad 20 toward the disc with uniform pressing loads.

Referring to FIG. 3, the ring gear inner parts 311 may project more toward the sun gear sections 110 and 210 (the left side in FIG. 3) than the ring gear outer parts 315. Due to this fact, it is possible to prevent the sun gear sections 110 and 210 from being released from the ring gear sections 310 when receiving rotational power from the driving unit 50.

As the carrier sections 150 and 250 are spline-coupled to the piston sections 170 and 270, the rotational power of the carrier sections 150 and 250 may be transmitted to the piston sections 170 and 270, specifically, the piston connection parts 173 and 273.

The piston connection parts 173 and 273 are coupled to the piston shafts 172 and 272 which are coupled to the piston bodies 171 and 271, and, by the rotational power received through the carrier sections 150 and 250, cause the piston bodies 171 and 271 to be linearly moved toward the brake pad 20.

Although the disclosure has been disclosed with reference to the embodiments illustrated in the drawings, the embodiments are only for illustrative purposes, and those skilled in the art will appreciate that various modifications and other equivalent embodiments are possible, without departing from the scope and spirit of the disclosure as defined in the accompanying claims. Thus, the true technical scope of the disclosure should be defined by the following claims.

What is claimed is:

1. A parking brake apparatus for a vehicle, comprising:
a driving unit including a plurality of motor sections;
a pair of pressing units configured to receive power from the driving unit and press a brake pad; and
a load transmission unit comprising a pair of ring gear sections connected to the pair of pressing units, respectively, and being meshed with each other to transmit a pressing load of any one of the pair of pressing units to the other.

2. The parking brake apparatus of claim 1, wherein each of the pair of pressing units comprises:
a sun gear section rotated by receiving power from the driving unit;
a planetary gear section rotated by being meshed with the sun gear section;
a carrier section coupled to the planetary gear section; and
a piston section connected to the carrier section, and pressing the brake pad by being moved toward the brake pad through receiving rotational power from the planetary gear section.

3. The parking brake apparatus of claim 2, wherein the pair of pressing units individually receive power from the plurality of motor sections, respectively.

4. The parking brake apparatus of claim 3,
wherein any one of the pair of pressing units receives power by being connected with some of the plurality of motor sections, and
wherein the other one of the pair of pressing units receives power by being connected with the other some of the plurality of motor sections.

5. The parking brake apparatus of claim 2, wherein the carrier section is spline-coupled to the piston section.

6. The parking brake apparatus of claim 5, wherein the piston section receives rotational power from the carrier section, and is linearly reciprocated relative to the brake pad depending on a rotating direction of the carrier section.

7. The parking brake apparatus of claim 2, wherein the sun gear section is dynamically connected to the driving unit through a connection gear section.

8. The parking brake apparatus of claim 7, wherein the sun gear section comprises:
a sun gear connection body coupled to the connection gear section; and
a sun gear formed on the sun gear connection body, having a rotation center that is concentric with a rotation center of the connection gear section, and meshed with the planetary gear section.

9. A parking brake apparatus, comprising:
a driving unit including a plurality of motor sections;
a pair of pressing units receiving power from the driving unit and pressing a brake pad; and
a load transmission unit installed between the pair of pressing units, connected to each of the pair of pressing units, and transmitting a pressing load of any one of the pair of pressing units to the other pressing unit,
wherein each of the pair of pressing units comprises:
a sun gear section rotated by receiving power from the driving unit;
a planetary gear section rotated by being meshed with the sun gear section;
a carrier section coupled to the planetary gear section; and
a piston section connected to the carrier section, and pressing the brake pad by being moved toward the brake pad through receiving rotational power from the planetary gear section,
wherein the pair of pressing units individually receive power from the plurality of motor sections, respectively,
wherein the load transmission unit includes a pair of ring gear sections,
wherein each of the pair of ring gear sections is rotatable by being meshed with the planetary gear section, and
wherein the pair of ring gear sections is meshed with each other.

10. The parking brake apparatus of claim 9, wherein each of the pair of ring gear sections comprises:

a ring gear inner part formed with an internal gear portion on an inner circumferential surface thereof to be meshed with the planetary gear section; and a ring gear outer part coupled to an outer surface of the ring gear inner part, and formed with an external gear portion on an outer circumferential surface thereof to be meshed with the other ring gear section neighboring thereon.

11. The parking brake apparatus of claim 10, wherein the ring gear inner part and the ring gear outer part are integrally formed.

12. The parking brake apparatus of claim 10, wherein the ring gear inner part projects more toward the sun gear section than the ring gear outer part, and surrounds the sun gear section and the planetary gear section.

\* \* \* \* \*